United States Patent
Cage et al.

(10) Patent No.: US 6,494,106 B1
(45) Date of Patent: Dec. 17, 2002

(54) DYNAMIC COUNTERBALANCE SYSTEM FOR CORIOLIS MASS FLOWMETERS

(75) Inventors: Donald R. Cage, Longmont, CO (US); Larry K. Carmichael, Platteville, CO (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 09/641,488

(22) Filed: Aug. 17, 2000

Related U.S. Application Data

(60) Provisional application No. 60/149,172, filed on Aug. 17, 1999.

(51) Int. Cl.[7] .................................................. G01F 1/84
(52) U.S. Cl. ................................................. 73/861.357
(58) Field of Search ...................... 73/861.357, 861.354

(56) References Cited

U.S. PATENT DOCUMENTS

| | | | | |
|---|---|---|---|---|
| 4,823,614 A | * | 4/1989 | Dahlin ..................... | 73/861.38 |
| 4,895,030 A | * | 1/1990 | Bergamini et al. ....... | 73/861.38 |
| 5,365,794 A | * | 11/1994 | Hussain et al. ......... | 73/861.357 |
| 5,398,554 A | * | 3/1995 | Ogawa et al. .......... | 73/861.355 |
| 5,497,665 A | * | 3/1996 | Cage et al. .............. | 73/861.38 |
| 5,795,010 A | * | 8/1998 | Kishiro et al. .......... | 73/861.357 |
| 5,796,012 A | * | 8/1998 | Gomi et al. ............ | 73/861.356 |
| 6,070,474 A | * | 6/2000 | van der Pol et al. ... | 73/861.357 |

FOREIGN PATENT DOCUMENTS

EP     0 598 287 A1     5/1994

OTHER PUBLICATIONS

Lukkarinen et al. Electro– and Magneto– rheological Fluids. http://www.Ice.fi/publications/biannual1999/node26.html.*

* cited by examiner

*Primary Examiner*—Benjamin R. Fuller
*Assistant Examiner*—Lilybett Martir
(74) *Attorney, Agent, or Firm*—Henry C. Query, Jr.

(57) ABSTRACT

The present invention is directed to a Coriolis-type flowmeter having a dynamic counterbalance system which comprises a flowtube through which a fluid to be measured is permitted to flow; the flowtube comprising first and second ends; a counterbalance which is vibrationally coupled to the flowtube proximate the first and second ends; an electromagnet device for vibrating the flowtube and the counterbalance in opposition to one another; the flowtube having a first frequency response to the vibrating means and the counterbalance having a second frequency response to the vibrating means; at least one inertial mass; and means for selectively coupling the inertial mass to the counterbalance to thereby alter the second frequency response by a desired amount; wherein in the event the second frequency response is different from the first frequency response, the inertial mass may be coupled to the counterbalance to alter the second frequency response by the desired amount to thereby make the second frequency response approximately the same as the first frequency response.

13 Claims, 8 Drawing Sheets

DYNAMIC COUNTERBALANCE SYSTEM FOR CORIOLIS MASS FLOWMETERS

This application is based on U.S. Provisional Patent Application No. 60/149,172, which was filed on Aug. 17, 1999.

BACKGROUND OF THE INVENTION

The present invention relates to an apparatus and method for balancing a Coriolis-type mass flowmeter, particularly one which comprises a single straight flowtube, over all conditions and frequencies to which the flowtube may be subjected during operation of the flowmeter Prior art Coriolis mass flowmeters typically include a flowtube through which a fluid to be measured is directed, electromagnetic force generating means for vibrating the flowtube in one of its modes of vibration, such at its $1^{st}$ natural bending mode of vibration, and one or more transducers for measuring the vibrational deflection, or shape, of the flowtube. The vibrating flowtube causes the Coriolis forces which are generated by the flowing fluid to bear against the wall of the flowtube and thus alter the vibrational shape of the flowtube. The altered vibrational shape is measured by the transducers and provides an indication of the flow rate of the fluid, as is well understood by those skilled in the art.

The flowtube comprises end connections, such as conventional pipe flange connections, through which the flowtube is connected to a supporting structure, such as a fluid flow pipe, and to which other components of the flowmeter may be secured. These supporting structures and other flowmeter components, which together are referred to herein as the support structure for the flowtube, define boundary conditions for the flowtube which may influence the operation of the flowmeter. The vibrations in the flowtube react against the support structure through the end connections, and these reaction forces can excite the support structure and consequently drain energy from the vibrating flowtube and result in erroneous flow rate readings.

Several mechanisms have been employed in prior art Coriolis mass flowmeters to counterbalance these deleterious reaction forces. For example, one prior art flowmeter comprises a fixed counterbalance which is similar in shape to the flowtube and includes weights to simulate the density of the fluid to be measured. Thus, when the flowtube is vibrated against this counterbalance device, the reaction forces generated by the counterbalance device will nullify the reaction forces from the flowtube at the end connections. However, these meters were found to be highly sensitive to ambient vibrations and changes in the boundary conditions of the flowtube. Another prior art flowmeter comprises two identical parallel flowtubes. The fluid to be measured is directed through both flow tubes and the flowtubes are vibrated in opposition to each other. Therefore, the tubes remain in near perfect balance regardless of changes in the fluid parameters or the boundary conditions of the flowmeter. Consequently, any resultant reaction forces that may be present at the end connections of the flow tubes are negligible. However, splitting the flow stream into two paths creates a pressure loss and turbulence and can also result in one flowtube becoming plugged. Other more recent attempts to effectively counterbalance the reaction forces from the flowtube rely on fixed counterbalance designs, which as mentioned above have some sensitivity to changes in the boundary conditions.

SUMMARY OF THE INVENTION

The present invention addresses these and other limitations in the prior art by providing a Coriolis mass flowmeter with a counterbalance system for balancing the vibrating flowtube to thereby nullify the reaction forces that the flowtube would otherwise induce in the support structure. The condition of balance between the vibrating flowtube and the counterbalance requires that the reaction forces generated by these structures be equal and opposite, thereby canceling each other at the point where the structures are coupled. This will result in the vibration of the system (that is, the vibration of the flowtube and the counterbalance) being contained and therefore isolated from any changes in the support structure or boundary conditions of the flowtube. To achieve balance between the flowtube and the counterbalance during all phases of operation of is the flowmeter, the counterbalance system must be able to change its frequency response to match that of the flowtube, which itself can change drastically in response to changing fluid parameters such as density, pressure and viscosity. To accomplish this, the present invention essentially provides a variable mass/spring/damper counterbalance system that is controlled by a current to alter the frequency response of the counterbalance as necessary to match the frequency response of the vibrating flowtube.

According to the present invention, therefore, a Coriolis-type mass flowmeter for measuring the flow rate of a fluid is provided which comprises a flowtube having first and second ends, a counterbalance which is vibrationally coupled to the flow tube proximate the first and second ends, means for vibrating the flowtube and the counterbalance in opposition to one another, at least one inertial mass, and means for selectively coupling the inertial mass to the counterbalance. In this manner, the frequency response of the counterbalance to the vibrating means can be changed to approximate the frequency response of the flowtube to the vibrating means by coupling the inertial mass to the counterbalance.

In the preferred embodiment of the invention, the counterbalance comprises an elongated beam which is designed to have a mass and stiffness distribution along its length similar to that of the flowtube for a given condition, such as when the flowtube is filled with water. The counterbalance is therefore designed to vibrate in a similar fashion, at the same frequency, and in opposition to the flowtube and thereby create equal and opposite reaction forces at the first and second ends of the flowtube, which will result in a balanced condition. In the event the flowmeter may need to measure fluids other than water, however, the frequency response of the flowtube may be altered by such fluids to the extent that it no longer matches the frequency response of the counterbalance, thus resulting in an unbalanced condition.

The present invention addresses this problem by the inclusion of the inertial masses. In the preferred embodiment of the invention, the inertial masses are disposed along the length of the counterbalance and can be coupled to or uncoupled from the counterbalance by application of a control current or signal. These inertial masses are suspended by a low frequency mounting system so that, when they are uncoupled, they contribute substantially no additional mass, stiffness, or damping to the counterbalance and therefore do not substantially alter its frequency response. If the flowmeter becomes unbalanced, one or more of the inertial masses can be either wholly or partially coupled to the counterbalance to add substantial mass and/or damping to the counterbalance and thereby alter its frequency response as necessary to match that of the flowtube. By controlling the coupling of the one or more inertial masses to the counterbalance, the requisite condition of balance can thus be restored "on the fly" over any desired range of fluid conditions.

In the preferred embodiment of the invention, the inertial mass comprises a cylindrical steel support member which is fixed to the counterbalance and an iron or steel cylinder or "bobbin" which is mounted within the support member by one or more flexural members. The flexural members permit the bobbin to move relatively freely in the direction of vibration of the counterbalance but restrict the movement of the bobbin in the transverse direction.

The preferred means for coupling the inertial mass to the counterbalance comprises an electrical coil which is preferably wrapped around the bobbin and a Magneto-Rheological fluid ("MRF") which is disposed in a gap between the bobbin and the support member. When it is desired that the mass be uncoupled from the counterbalance, no current is applied to the coil, and the bobbin is thus free to stay essentially motionless while the counterbalance vibrates. When it is desired that the bobbin be coupled to the counterbalance, a current is applied through the coil. Upon the application of the current, a magnetic field is produced in the gap which causes the MRF to stiffen, effectively coupling the bobbin to the counterbalance. In this coupled condition, the bobbin will vibrate substantially with the counterbalance. This additional mass then alters the frequency response of the counterbalance. By coupling or uncoupling one or more masses to the counterbalance, the desired balanced condition can be achieved regardless of the particular conditions of the fluid in the flowtube.

These and other objects and advantages of the present invention will be made apparent from the following detailed description, with reference to the accompanying drawings.

DETAILED DESCRIPTION OF THE PREFERRED EMBODIMENTS

Figure 1:
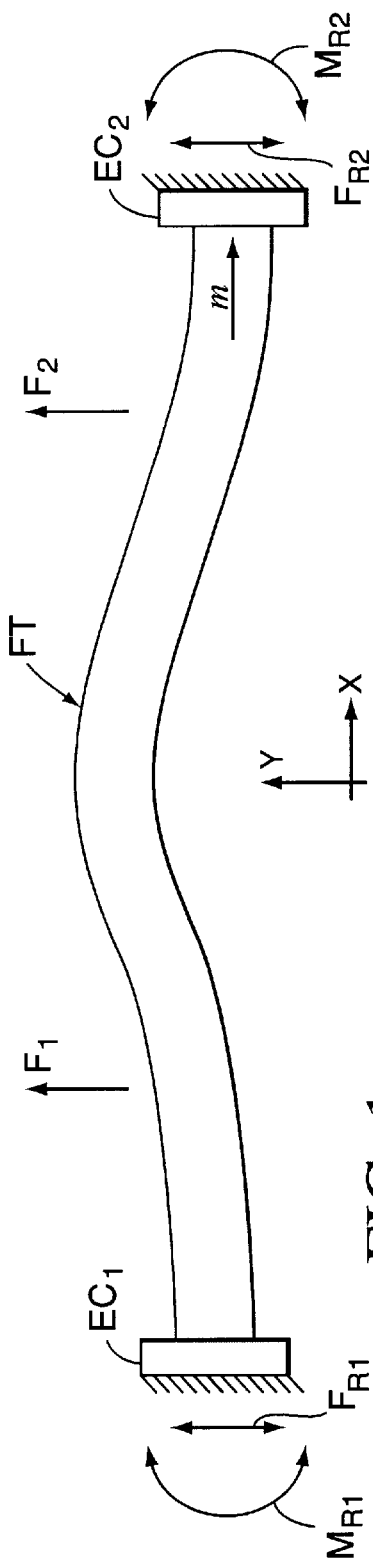
FIG. 1 is a representation of a single straight flowtube of a Coriolis mass flowmeter operating in its $1^{st}$ bending mode of vibration.

FIG. 1 is a representation of certain components of an exemplary single straight tube Coriolis mass flowmeter. The flowmeter is shown to comprise an elongated flowtube FT through which a fluid to be measured is permitted to flow. The flowtube FT is depicted in its first bending mode of vibration, which has been greatly exaggerated for purposes of clarity. The Flowtube FT includes first and second end connections $EC_1$ and $EC_2$, such as conventional pipe flange connections, by which the flowmeter is connected to a supporting structure (not shown), such as a fluid flow pipe. The flowmeter typically also includes other components which are connected to the end connections $EC_1$, $EC_2$, such as an enclosure and a housing for the electronics components of the flowmeter (not shown). All the components and the associated supporting structures which are connected either directly or indirectly to the end connections $EC_1$, $EC_2$ define the boundary conditions for the performance of the flowtube FT and are referred to herein as simply the support structure for the flowtube FT.

In operation of the flowmeter, the flowtube FT is subjected to periodic electromagnetic forces $F_1$ and $F_2$ that cause the flowtube to vibrate in its $1^{st}$ bending mode of vibration, which is typically the preferred mode of vibration. This vibratory deflection of the flowtube causes the Coriolis forces, which are generated by the fluid flowing through the flowtube, to bear against the wall of the flowtube and thus alter the deflected shape of the flowtube. The altered shape of the flowtube is measured by conventional means to yield an indication of the mass flow rate m of the fluid flowing through the flowtube, in a manner that is well understood in the art.

The vibratory deflection of flowtube FT induces both shear reaction forces $F_{R1}$, $F_{R2}$ and bending moment reaction forces $M_{R1}$, $M_{R2}$ in the attached support structure through the end connections $EC_1$, $EC_2$. These reaction forces can excite the support structure and cause it to vibrate according to its own frequency response characteristics. The vibration of the support structure necessarily takes energy from the vibrating flowtube FT, and this can alter the deflected shape of the flowtube. This altered shape can be similar to, and thus be interpreted as, the altered shape caused by Coriolis forces and can therefore result in erroneous mass flow rate readings. This condition typically shows up as an unstable or shifting "Zero" (i.e., the zero flow rate output signal), or an unstable or shifting "Sensitivity" (i.e., the ratio of the output signal to the true mass flow rate).

Figure 2:
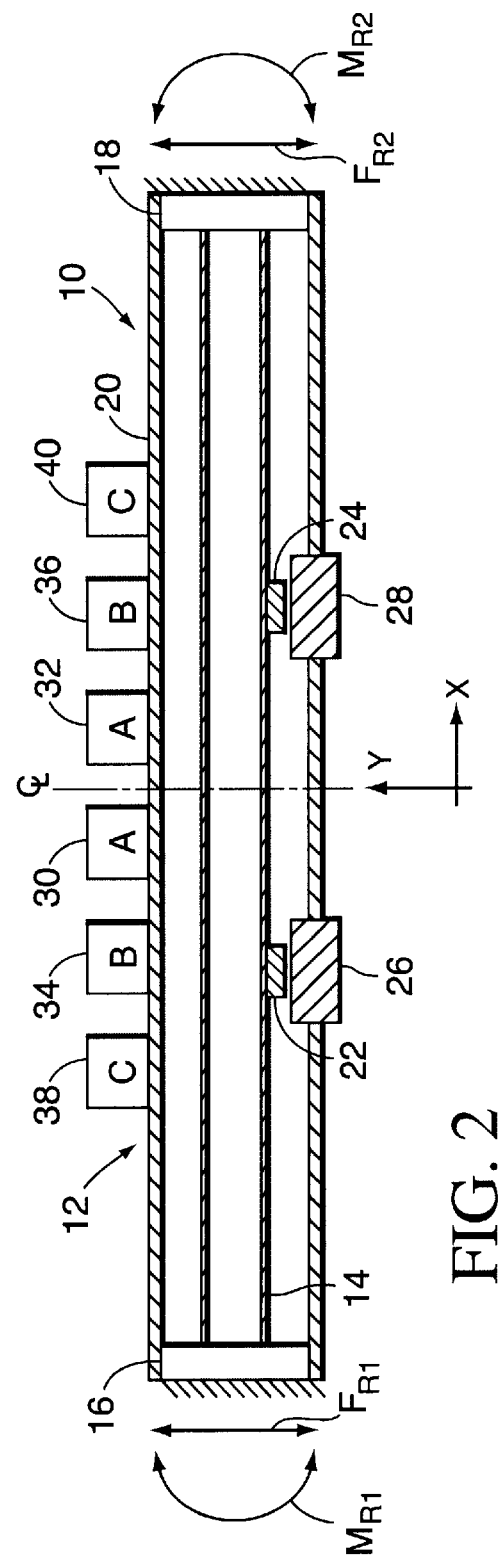
FIG. 2 is a representation of one embodiment of a Coriolis mass flowmeter of the present invention showing the components of the counterbalance system of the invention installed on a single straight flowtube.

The Coriolis mass flowmeter of the present invention comprises a counterbalance system for canceling the reaction forces which the vibrating flowtube would otherwise induce in the support structure, thereby effectively isolating the flowtube from the support structure and greatly enhancing the accuracy and performance of the meter. Referring to FIG. 2, the Coriolis mass flowmeter of the present invention, which is indicated generally by reference number 10, is shown to comprise a counterbalance system 12 and a flowtube 14 having first and second end connections 16, 18, such as conventional pipe flange connections. The flowtube 14 is preferably a single straight tube which is made of a metallic material, such as titanium. The end connections 16, 18 may be formed integrally with the flowtube 14 or constructed separately and attached thereto, such as by welding. In addition, each end connection 16, 18 is rigidly attached to a support structure (not shown), such as a fluid flow pipe or pipe support.

The counterbalance system 12 comprises a counterbalance beam 20 which is ideally designed to have a similar mass, damping, and stiffness distribution along its length as the flowtube 14. The beam 20 is preferably a simple beam made of a metallic material, such as steel, which comprises a U-shaped, C-shaped, square, rectangular, round, elliptical, or similar cross sectional configuration. The ends of the beam 20 are fixedly attached to corresponding ends or the end connections 16, 18 of the flowtube 14, such as by welding. Thus, the beam 20 is vibrationally coupled to the flowtube 14 in a manner that will allow their respective reaction forces $F_{R1}$, $F_{R2}$, $M_{R1}$, and $M_{R2}$ to be combined.

The flowmeter 10 also includes preferably two drive magnets 22 and 24 operating in conjunction with two corresponding coils 26 and 28 to create the electromagnetic driving forces ($F_1$ and $F_2$ of FIG. 1) which will vibrate the flowtube 14. The magnets 22, 24 are mounted to the flowtube 14 at suitable positions along the length of the flowtube to permit the driving forces to cause the requisite vibration of the flowtube. The coils 26, 28 are mounted on the counterbalance beam 20 opposite the magnets 22, 24. Therefore, the driving forces will vibrate the flowtube 14 in opposition to the beam 20. A single magnet/coil pair could be used to drive the requisite vibration of the flowtube 14; however, the use of two magnet/coil pairs is preferred because it allows for multiple modes of vibration to be excited, along with any required reference forces.

With the flowmeter 10 thus arranged and vibrating, the combined reaction forces $F_{R1}$, $F_{R2}$, $M_{R1}$ and $M_{R2}$ of the flowtube 14 and the counterbalance beam 20, if present, will bear against the support structure at the end connections 16, 18 and will allow the vibrational energy to escape into the support structure, thus degrading the efficiency, performance and accuracy of the meter. The presence of any combined reaction forces is a result of an imbalance between the frequency response characteristics of the flowtube 14 and those of counterbalance beam 20.

To achieve a balanced condition under these circumstances, the counterbalance system 12 preferably also comprises a number of inertial masses 30 through 40 which can be coupled to or de-coupled from the counterbalance beam 20. By coupling one or more of these inertial masses to the counterbalance beam 20, the frequency response of the beam can be altered to match that of flowtube 14, thus creating a condition of balance between the flowtube and the beam and causing the combined reaction forces $F_{R1}$, $F_{R2}$, $M_{R1}$ and $M_{R2}$ to become insignificant or zero.

In the preferred embodiment of the invention, the inertial masses 30 through 40 are distributed along the length of the counterbalance beam 20 in operational pairs of masses which have the same mass magnitude and are located symmetrically about the mid-length centerline CL of the beam. The three inertial mass pairs shown in FIG. 2 may hereafter be referred to as the A-pair (masses 30, 32), the B-pair (masses 34, 36), and the C-pair (masses 38, 40). While three inertial mass pairs are shown in this exemplary embodiment, the optimal number of inertial masses for a given design can be as few as one or as many as desired, the exact number depending on factors which will be described hereafter.

The inertial masses 30 through 40 are preferably positioned along the length of the counterbalance beam 20 as will now be described. The A-pair is located as close to the centerline CL of the counterbalance beam 20 as practical. Thus, when the beam 20 is vibrating in its $1^{st}$ bending mode of vibration, the A-pair will vibrate at the greatest amplitude and thus have the largest inertial effect on the beam. The A-pair could be replaced by a single inertial mass at the centerline of the beam having twice the mass magnitude as the mass 30; however, maintaining the same design for all the inertial masses simplifies the manufacture of the flowmeter 10. The B-pair is preferably located away from the centerline CL at a position where its amplitude in the $1^{st}$ bending mode of vibration of the beam 20 is about 0.707 times that of the A-pair under normal vibration, that is, with a select fluid flowing through the flowtube 14. Similarly, the C-pair is preferably located away from the centerline CL at a position where its amplitude in the $1^{st}$ bending mode of vibration of the beam 20 is about 0.5 times that of the A-pair under normal vibration.

By locating the inertial mass pairs along the length of the counterbalance beam 20 as just described and selectively coupling the mass pairs to the beam, a binary-type of effect on the frequency response of the beam may be approximated. For example, by coupling only the A-pair to the beam 20, the natural frequency of the beam will drop by some increment (for example 80 Hz). Similarly, by coupling only the B-pair to the beam 20, the natural frequency of the beam will drop by about one half of that increment (for example 40 Hz). Likewise, by coupling only the C-pair to the beam 20, the natural frequency of the beam will drop by about one fourth of that increment (for example 20 Hz). Furthermore, by coupling certain combinations of the inertial mass pairs to the counterbalance beam 20, other incremental reductions in the natural frequency of the beam may be obtained. The total number of possible combinations of the inertial mass pairs is $(2)^n$, where n is the number of inertial mass pairs. Thus, with three inertial mass pairs, eight different combinations of the inertial mass pairs are possible. Therefore, in the preferred embodiment of the invention the natural frequency of the counterbalance beam 20 can be selected reduced by any of eight incremental values.

Figure 3:
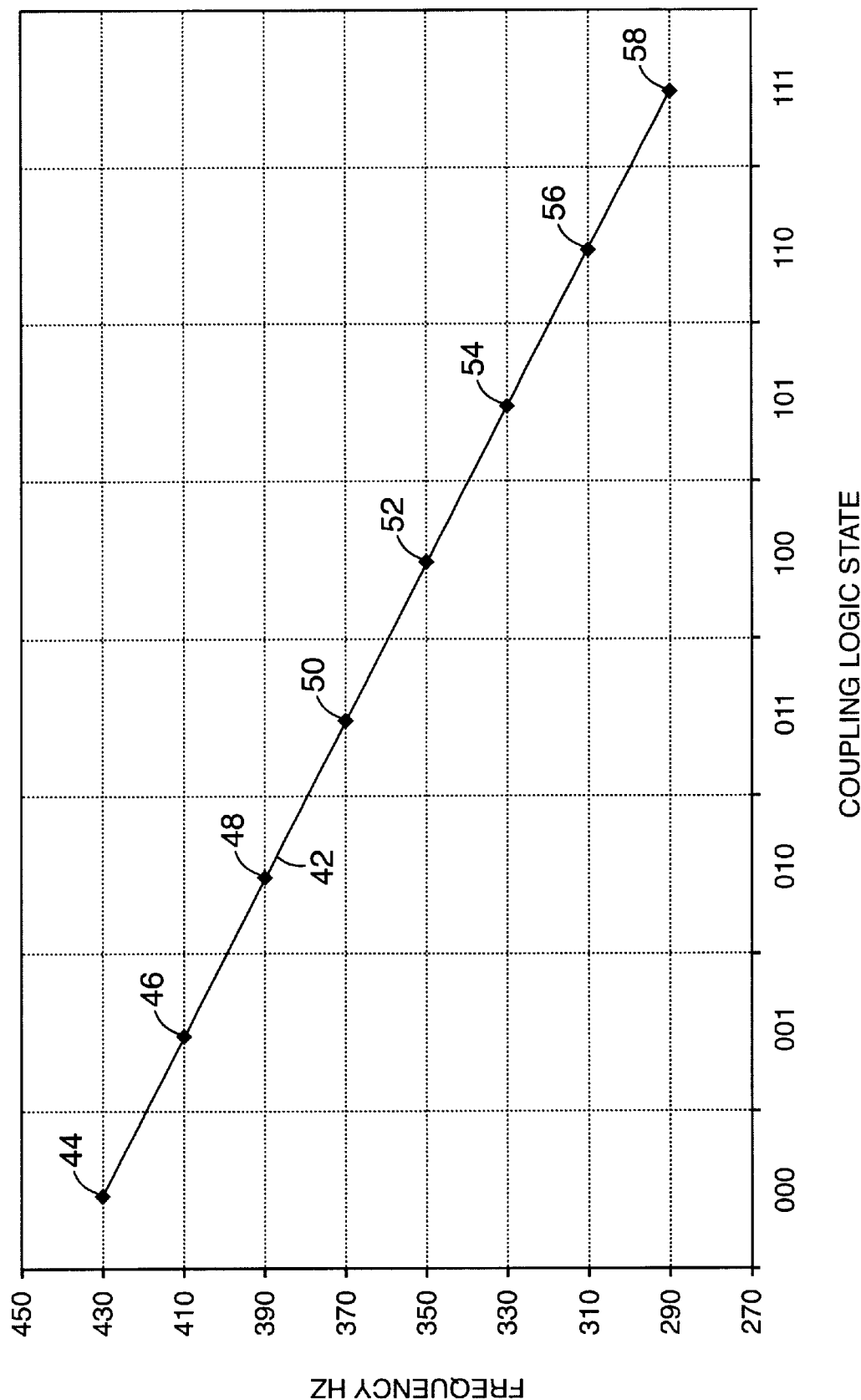
FIG. 3 is a graph showing an exemplary relationship between the natural frequency of the counterbalance system of the invention as a function of the inertial mass coupling logic state of the counterbalance system.

FIG. 3 depicts one possible relationship between the natural frequency of an exemplary counterbalance beam 20 and the coupling logic state of the inertial mass pairs, that is, the possible combinations of inertial mass pairs which can be coupled to the beam. The frequency curve 42 indicates all the possible natural frequencies that the beam 20 can have for this exemplary design, depending on the coupling logic state of the inertial mass pairs. In FIG. 3, the horizontal axis represents the coupling logic state of the inertial mass pairs expressed in binary (A-pair, B-pair, C-pair) format. For example the coupling logic state 101 means that the A-pair is coupled, the B-pair is uncoupled and the C-pair is coupled.

Figure 4:
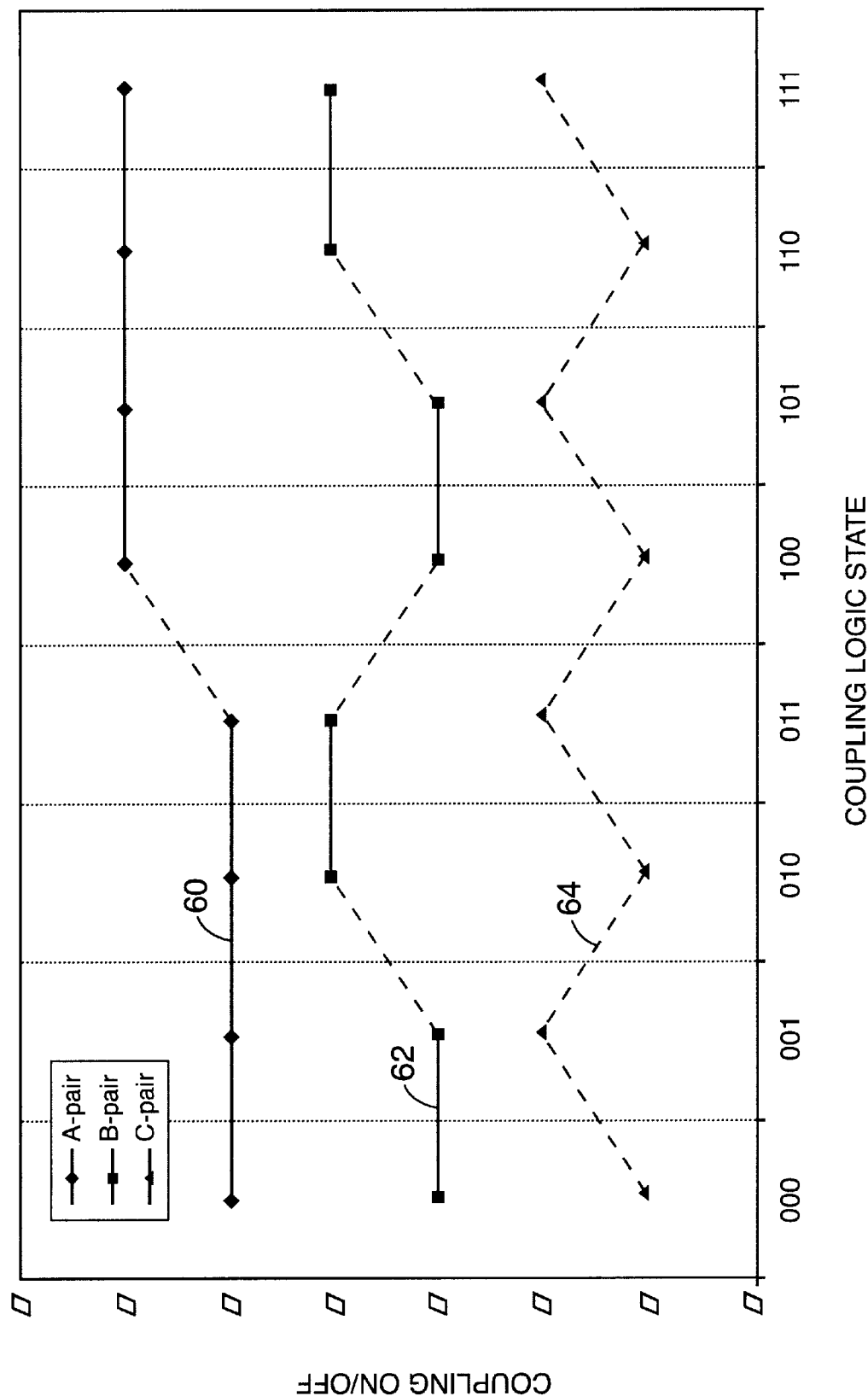
FIG. 4 is a logic diagram showing the on/off logic sequence for certain representative inertial mass pairs of the counterbalance system of the invention as a function of the inertial mass coupling logic state of the counterbalance system.

By fully coupling or uncoupling certain combinations of inertial mass pairs to the counterbalance beam 20, the beam may have any of the specific natural frequencies represented by the points 44 through 58 in FIG. 3. By partially coupling certain combinations of inertial mass pairs to the beam, the beam may have any intermediate natural frequency between the points 44 through 58. FIG. 4 depicts the coupling logic state sequence for coupling or de-coupling the combinations of inertial mass pairs necessary to achieve the frequencies between the points 44 through 58 on the curve 42. In FIG. 4, logic lines 60, 62 and 64 represent the on or off (coupled= on or high; uncoupled=off or low) state of the inertial mass pairs A-pair, B-pair and C-pair, respectively. To smoothly transition from one frequency to another, the control current which is required to effect the coupling of a given inertial mass pair is ramped over a range of intermediate values, as indicated by the dashed portions of the logic lines.

During normal operation of the flowmeter 10, the counterbalance beam 20 will vibrate in opposition to the flowtube 14 in the 1$^{st}$ bending mode of vibration at a particular frequency determined by the design of the flowmeter and the parameters of the fluid in the flowtube. For instance, an exemplary 1" flowmeter could be designed to vibrate at a frequency of 350 Hz with water at a given temperature and pressure in the flowtube 14. If the designer determines that this is a nominal center frequency and that the particular fluid parameters will cause the frequency of the flowtube to be either slightly higher or lower than this, then he may choose to balance the counterbalance beam 20 with the A-pair coupled, the B-pair uncoupled, and the C-pair uncoupled (representing logic state 100). This would be a preferred coupling logic state according to the frequency relationship depicted in FIG. 3 and would allow for a balanced condition over a range of both higher and lower natural frequencies from the nominal center frequency.

It should be apparent from the above description that the exact location or mass magnitude of any inertial mass or mass pair can be modified as necessary to achieve a specific frequency response for the counterbalance beam 20. For example, three inertial mass pairs having discrete mass magnitudes could all be located at the same longitudinal position, such as the centerline CL of the counterbalance beam 20. This arrangement would result in a relationship of binary-type frequency increments similar to that of curve 42 of FIG. 3. Similarly, the locations and/or mass magnitudes of the inertial masses or inertial mass pairs can be selectively altered to achieve specific results, for example, to concentrate better frequency "resolution" in the frequency range of a given set of conditions for a particular fluid, such as water. By modifying these locations and/or mass magnitudes, curve 42 of FIG. 3 can therefore be modified to have a desired slope or shape as may be required for a given design.

An important aspect to the use of multiple inertial mass pairs relates to the potential power loss due to the damping which results from partially coupled inertial masses. Damping can occur when there is both a vibratory coupling force acting on the inertial mass (i.e., the force coupling the inertial mass to the vibrating counterbalance beam 20), and relative motion between the inertial mass and the counterbalance beam. The product of force times relative amplitude times frequency defines the magnitude of the power loss (i.e., newtons x meters x radians/second=watts). If a given inertial mass is completely coupled to the counterbalance beam 20 (i.e., there is zero motion of the inertial mass relative to the beam), then the power loss is zero. Similarly, if a given inertial mass is completely uncoupled from the beam (i.e., the coupling force is zero), then the power loss is again zero. However, if a given inertial mass is partially coupled (i.e., some finite motion and some finite coupling force exist relative to the beam), then the power loss will have a finite value reaching a maximum between any two specific frequency points 44 through 58 of FIG. 3. By using more inertial masses or mass pairs, the need to only partially couple certain inertial mass pairs to the counterbalance beam 20 to achieve intermediate frequency values is reduced. Therefore, the power losses resulting from partially coupled inertial masses can be minimized for a given design.

Figure 5:
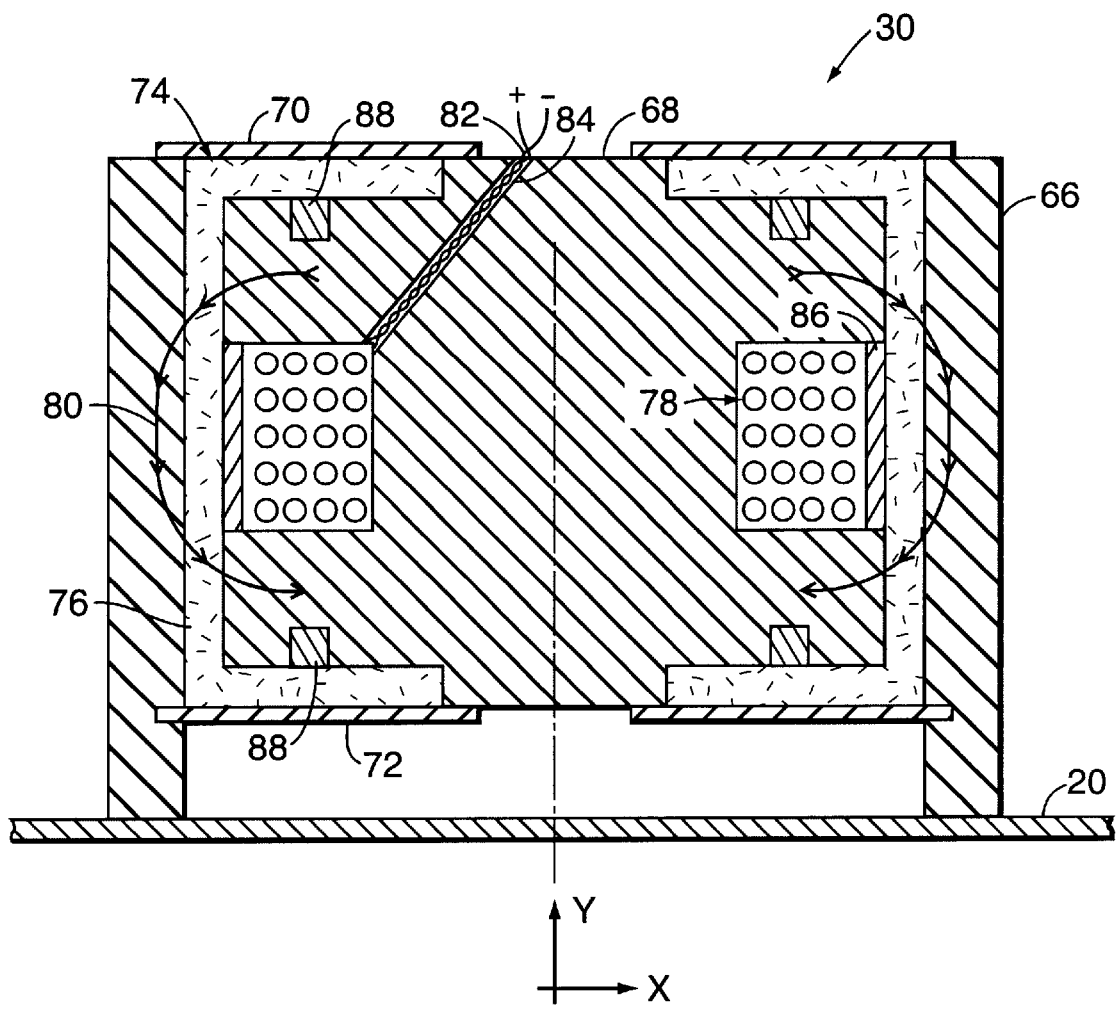
FIG. 5 is a cross sectional view of an inertial mass component according to a preferred embodiment of the counterbalance system of the present invention.

Referring now to FIG. 5, one embodiment of an inertial mass which is suitable for use in the counterbalance system 12 of the present invention will now be described. The exemplary inertial mass 30 is shown to comprise a generally tubular support member 66 which is fixedly attached to the counterbalance beam 20 by suitable means, such as welding or brazing. Support member 66 is preferably made of a magnetically permeable material, such as carbon steel, and is optimally machined along its lower edge to conform to the surface of the counterbalance beam 20. The inertial mass 30 also comprises a generally cylindrical mass member or "bobbin" 68 which ideally includes upper and lower axial bosses extending from the top and bottom surfaces thereof, respectively. The bobbin 68 is preferably constructed of iron or steel and is connected to the support member 66 by upper and lower annular flexural members 70 and 72, respectively, each of which preferably comprises an outer diameter and a central hole defining an inner diameter. The outer diameter of each flexural member 70, 72 is secured to the support member 66 by welding or brazing, and the inner diameter of each flexural member is attached to a corresponding one of the bosses of the bobbin 68 in a similar fashion. The flexural members 70, 72 are preferably thin diaphragm-type members that are constructed of stainless steel and are optimally either flat (as shown in FIG. 5) or convoluted. Thus, the flexural members provide a relatively high frequency coupling (that is, higher than the operating vibration frequency of the flowmeter 10) between the bobbin 68 and the support member 66 in a direction perpendicular to the y-axis, but a relatively low frequency coupling (that is, lower than the operating vibration frequency of the flowmeter) in the direction of the y-axis, which is the direction of operational vibration for the flowmeter 10. Therefore, the bobbin 68 is relatively free to move in the y-direction relative to the support member 66 but is generally restricted from moving perpendicular to the y-axis.

The inertial mass 30 also includes means for selectively coupling the bobbin 68 to the counterbalance beam 20 in at least the direction of the y-axis. A Magneto-Rheological fluid ("MRF") 74, for example MRF-132LD manufactured by the Lord Corporation of Cary, N.C., is disposed within a gap 76 formed between the bobbin 68 and the support member 66. The MRF is ideally contained within the gap 76 by the flexural members 70, 72. A coil 78 for generating a magnetic field 80 through the MRF is wound around a preferably reduced diameter portion of the bobbin 68. Current is supplied to the coil 78 through a pair of wires 82 which preferably extend from the top of the inertial mass through a bore 84 formed in the bobbin 68. A seal ring 86, which is preferably a thin walled stainless steel tube section, is welded or brazed to the bobbin 68 to hermetically seal the coil 78 within the reduced diameter portion of the bobbin.

The inertial mass 30 may also comprise one or more preferably annular accumulators 88, which in FIG. 5 are shown positioned in corresponding grooves formed in the top and bottom surfaces of the bobbin 68. The accumulators 88 function as compressible reservoirs for the MRF to accommodate thermal expansion of the MRF relative to the support member 66 and bobbin 68 and to minimize the "pumping" effects on the MRF, as will be described hereafter. In the preferred embodiment of the invention, the accumulators 88 comprise a low durometer foam or sponge elastomer material, such as Viton® or nitril, having a closed-cell foam construction. The closed cells within accumulators 88 are normally filled with nitrogen, and thus allow for compression and expansion of the MRF 74. The flexural members 70, 72 may also be designed (for example, as convoluted-style diaphragms) to accommodate the thermal expansion of MRF 74.

The use of an MRF as a coupling means for the inertial mass 30 is preferred because the MRF has the characteristic of drastically changing its operational viscosity as a function of the strength of the magnetic field applied to the MRF. Referring still to FIG. 5, a displacement of the bobbin 68 in the y-direction relative to the support member 66 causes both a shearing of the MRF 74 in the gap 76 and a "pumping" or displacement of some MRF from above to below the bobbin 68. At a low viscosity, this shearing and pumping of the MRF 74 can happen easily without transferring any significant coupling forces from the support member 66 to the bobbin 68. However, when a magnetic field is applied to the MRF 74, its viscosity increases dramatically (as the manufacturer describes it, ". . . from the consistency of motor oil to that of cold peanut butter"), essentially locking the motion of the bobbin 68 to the motion of support member 66 and thereby coupling the mass of the bobbin to the counterbalance beam 20.

Figure 6:
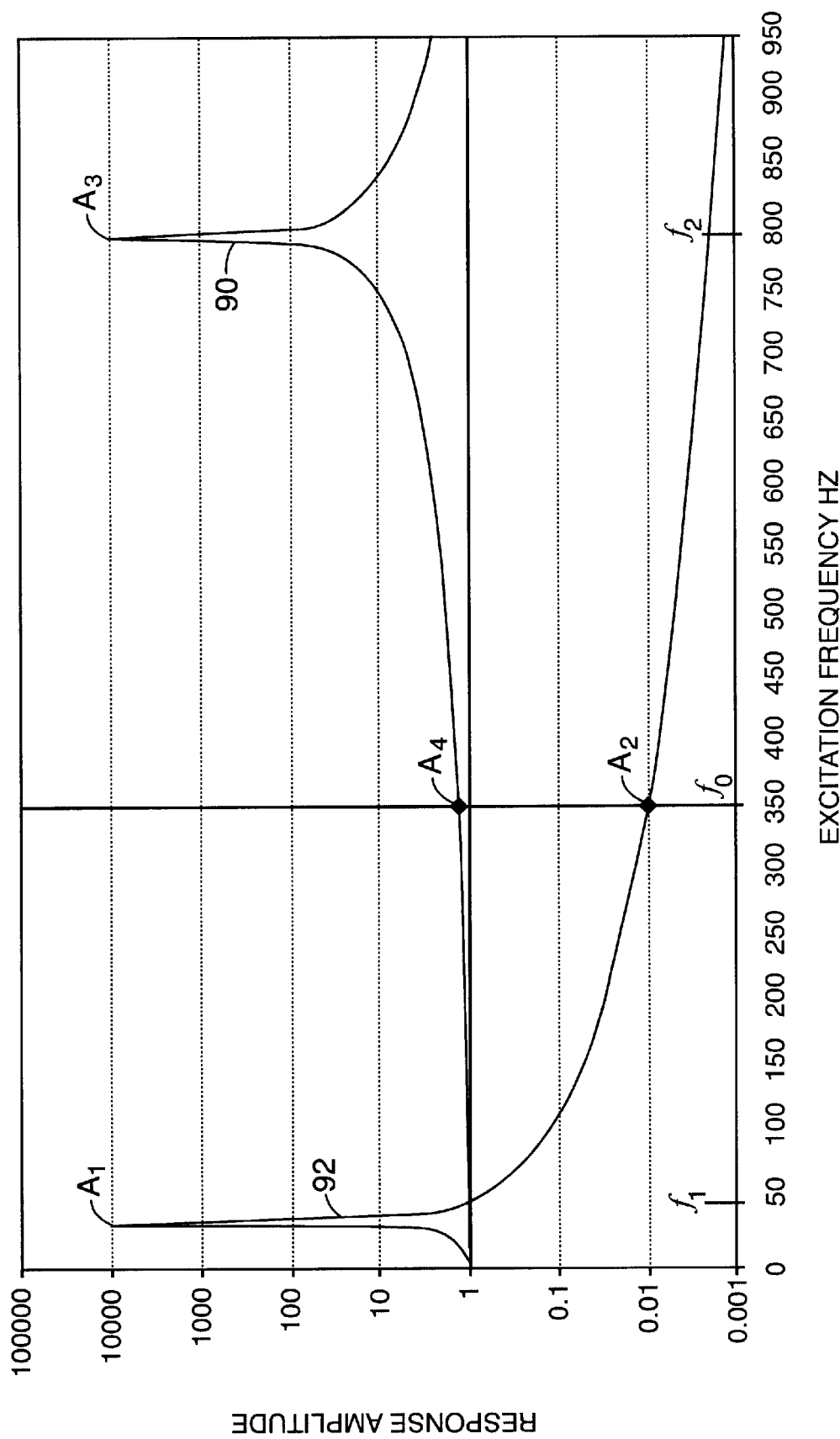
FIG. 6 is a graph of two exemplary frequency response curves showing the frequency response of a representative inertial mass component both in a coupled condition and in an uncoupled condition.

FIG. 6 depicts the frequency response curves for an inertial mass 30 in the coupled (curve 90) and the uncoupled (curve 92) conditions. These frequency response curves show the relationship between the response amplitude of the bobbin 68 as a function of the excitation frequency of the inertial mass 30, wherein the excitation force is delivered via the counterbalance beam 20 and the MRF 74. In the uncoupled condition, curve 92 shows that the response amplitude of the bobbin 68 has a maximum value $A_1$ at a relatively low frequency $f_i$ of about 35 Hz. The inertial mass 30 is designed such that this maximum value occurs at a frequency which, as determined by the y-directional stiffness of the flexural members 70, 72, is substantially lower than the operating frequency $f_o$ of the flowmeter 10, which in this example is 350 Hz. In addition, curve 92 falls off precipitously at frequencies above $f_i$, and at the operating frequency $f_o$ curve 92 shows a very small value $A_2$, which is negligible. Thus, the bobbin 68 experiences negligible motion in an uncoupled condition and consequently has an insignificant effect on the vibration of the counterbalance beam 20.

In the coupled condition of the inertial mass 30, curve 90 shows that the bobbin 68 has a maximum response amplitude $A_3$ at a frequency $f_2$. The inertial mass 30 is designed such that this maximum value occurs at a frequency which, as determined by the y-directional stiffness of the flexural members 70, 72 in combination with the added stiffness resulting from the coupling of the bobbin 68 to the support member 66 by the MRF, is substantially higher than the operating frequency $f_o$ of the flowmeter 10. In addition, the curve 90 maintains a value of one or higher below this peak value $A_3$, and at the operating frequency $f_o$ curve 90 shows a response amplitude of $A_4$ which is substantially equal to one. This indicates that at the operating frequency $f_o$, the bobbin 68 is vibrating with the same amplitude as that of the counterbalance beam 20. Thus, the bobbin 68 achieves full amplitude motion in a coupled condition and the inertial mass 30 consequently has a full inertial effect on the vibration of counterbalance beam 20.

Figure 7:
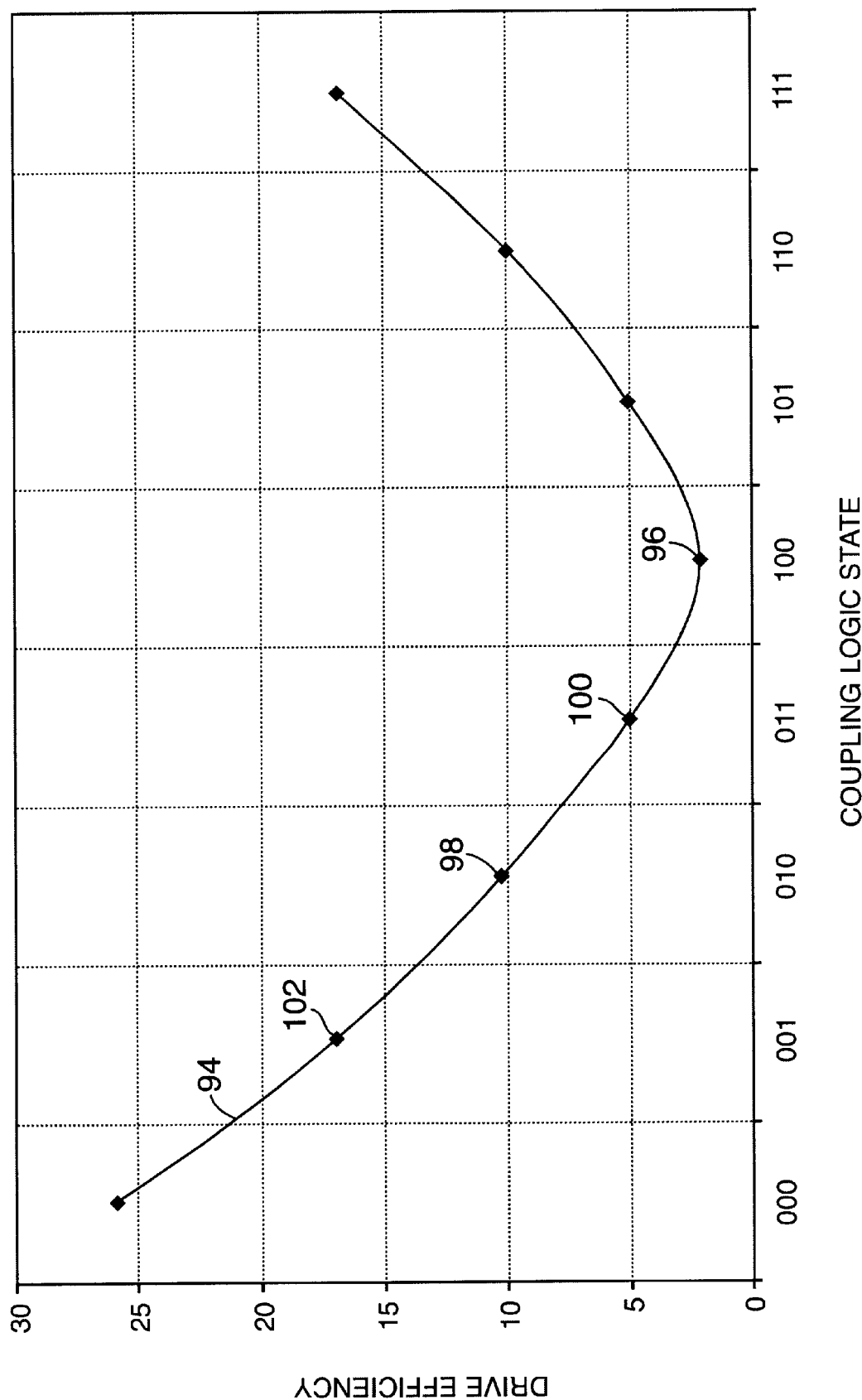
FIG. 7 is a graph showing an exemplary relationship between the drive efficiency of the flowmeter of the present invention and the inertial mass coupling logic state of the counterbalance system of the invention.

The determination of the optimal balance condition for the flowmeter 10, and thus whether to couple or uncouple additional inertial masses to the counterbalance beam 20 for a given set of operating conditions, can be based on many different factors. For the exemplary design of the preferred embodiment of the invention, the optimization criteria could be the "drive efficiency" of the flowmeter 10. As previously explained, a condition of unbalance results in energy being lost to the support structure for the flowtube 14. Therefore, a value for the drive efficiency of the flowmeter 10 can be the power required to maintain a given vibration amplitude in the flowtube 14, and this value can be minimized as the optimization parameter. FIG. 7 depicts one possible exemplary relationship between this drive efficiency parameter and the inertial mass coupling logic states for a given design and set of fluid conditions. The drive efficiency curve 94 shows that the relationship is a $2^{nd}$ order curve having a local minimum at a mass coupling logic state indicated by point 96. This drive efficiency minimum point 96 represents the optimal balance condition for the flowmeter 10. However, in practice the curve 94, along with its minimum point 96, can shift right or left depending on the parameters of a particular fluid, such as density. Therefore a method to decide whether to couple additional inertial masses (moving right along the horizontal axis) or to uncouple additional inertial masses (moving left along the horizontal axis) could be employed to determine the optimal balance condition for the flowmeter 10.

One method to decide whether to couple or uncouple additional inertial masses to the counterbalance beam 20 is simply to test the coupling logic states on either side of the logic state corresponding to the minimum drive efficiency to see if the drive efficiency improves or worsens. For example, if a coupling logic state of 010 results in a drive efficiency value indicated by point 98 on curve 94, and by switching to logic state 001 the drive efficiency is determined to go up to the value indicated by point 102, then the move from logic state 010 to logic state 001 was the wrong direction. Similarly, if by switching to coupling logic state 011 a lower drive efficiency value indicated by point 100 is achieved, then this move in logic states is in the right direction. By continuing this process of testing coupling logic states to the left and right of the current value, and updating the current value to the new minimum value, the minimum drive efficiency value 96 can be found and tracked continuously over the changing fluid parameters.

Another method to determine the optimal balance condition of the flowmeter 10 is to use the ratio of the vibration amplitude of the flowtube 14 to the vibration amplitude of the counterbalance beam 20, since this ratio should remain relatively constant (or follow a known algorithm involving temperature or other parameters) at optimal balance. For example, an increase in the density of the fluid in the flowtube 14 could require a similar addition of inertial masses to the counterbalance beam 20 to maintain the vibration amplitude ratio at its original value. By monitoring these two vibration amplitudes during operation of the flowmeter 10, the vibration amplitude ratio can be held constant (or held to follow some known algorithm) with an electronic servo which couples or uncouples the inertial masses to the counterbalance beam 20 according to a prescribed algorithm.

Figure 8:
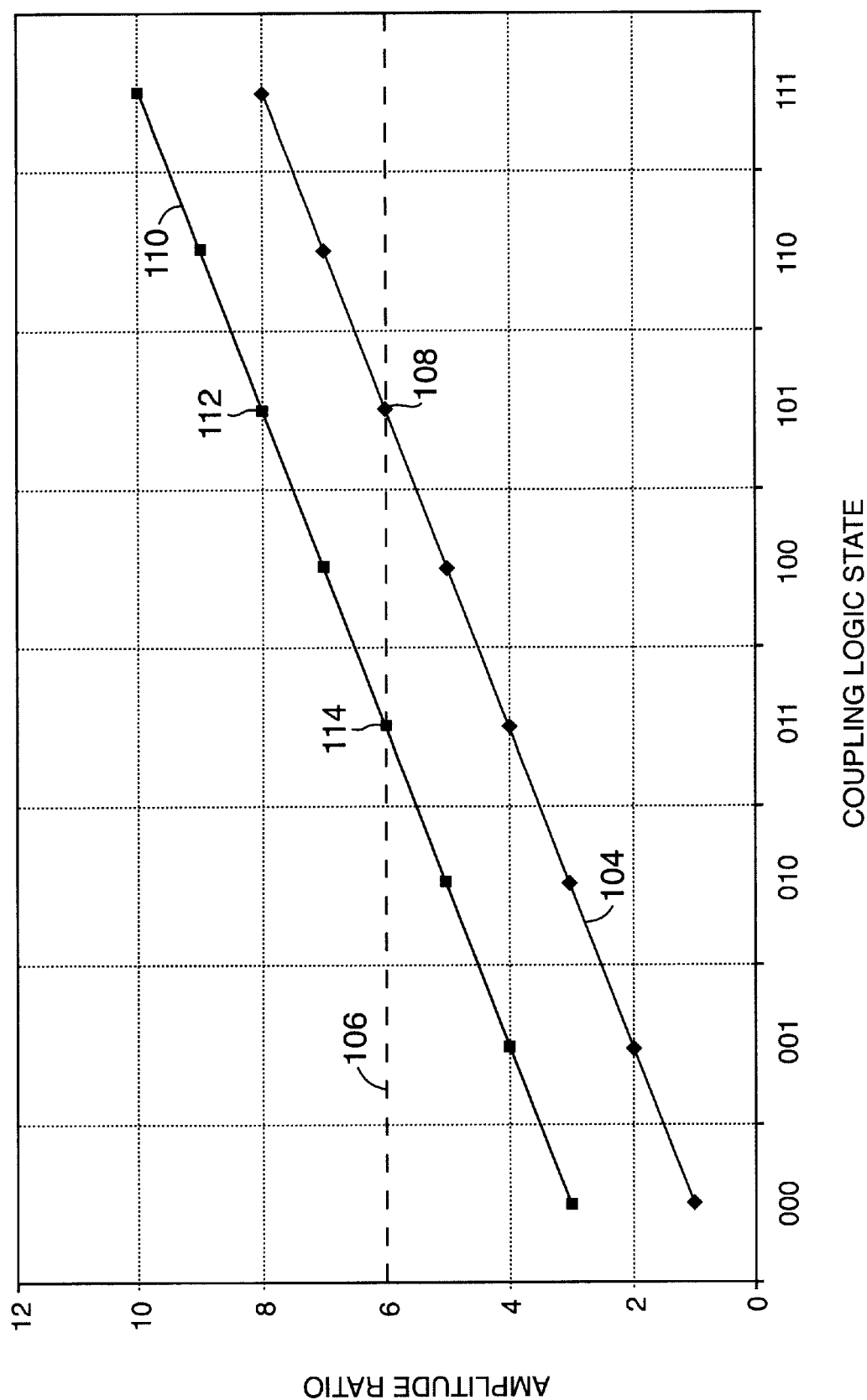
FIG. 8 is a graph showing an exemplary relationship between the amplitude ratio of a vibrating flowtube to its corresponding counterbalance beam as a function of the inertial mass coupling logic state of the counterbalance system.

FIG. 8 depicts one possible relationship between the vibration amplitude ratio as a function of the inertial mass coupling logic state. Curve 104 depicts this relationship for an exemplary fluid condition. The vibration amplitude ratio value of 6 along line 106 can be predetermined through calibration to be the optimum balance condition for the flowmeter 10. For this example, line 106 is shown to intersect the curve 104 at point 108, which corresponds to coupling logic state 101. If the fluid properties change, for example if the fluid becomes less dense, curve 104 could shift to the position of curve 110. Should this occur, the calculated value of the amplitude ratio would go up to 8 at point 112 on curve 110. This change would be detected by the servo, and since the curve has a positive slope within the depicted range, the servo would know to uncouple the inertial masses as necessary to return the vibration amplitude ratio to the optimal target value of 6 along line 106, which for this example would occur at point 114 corresponding to a new balanced logic state of 011.

These methods for determining and achieving the optimal balance condition for the flowmeter 10 can be employed in conjunction with the present invention, but are not necessarily part of the invention.

Figure 9:
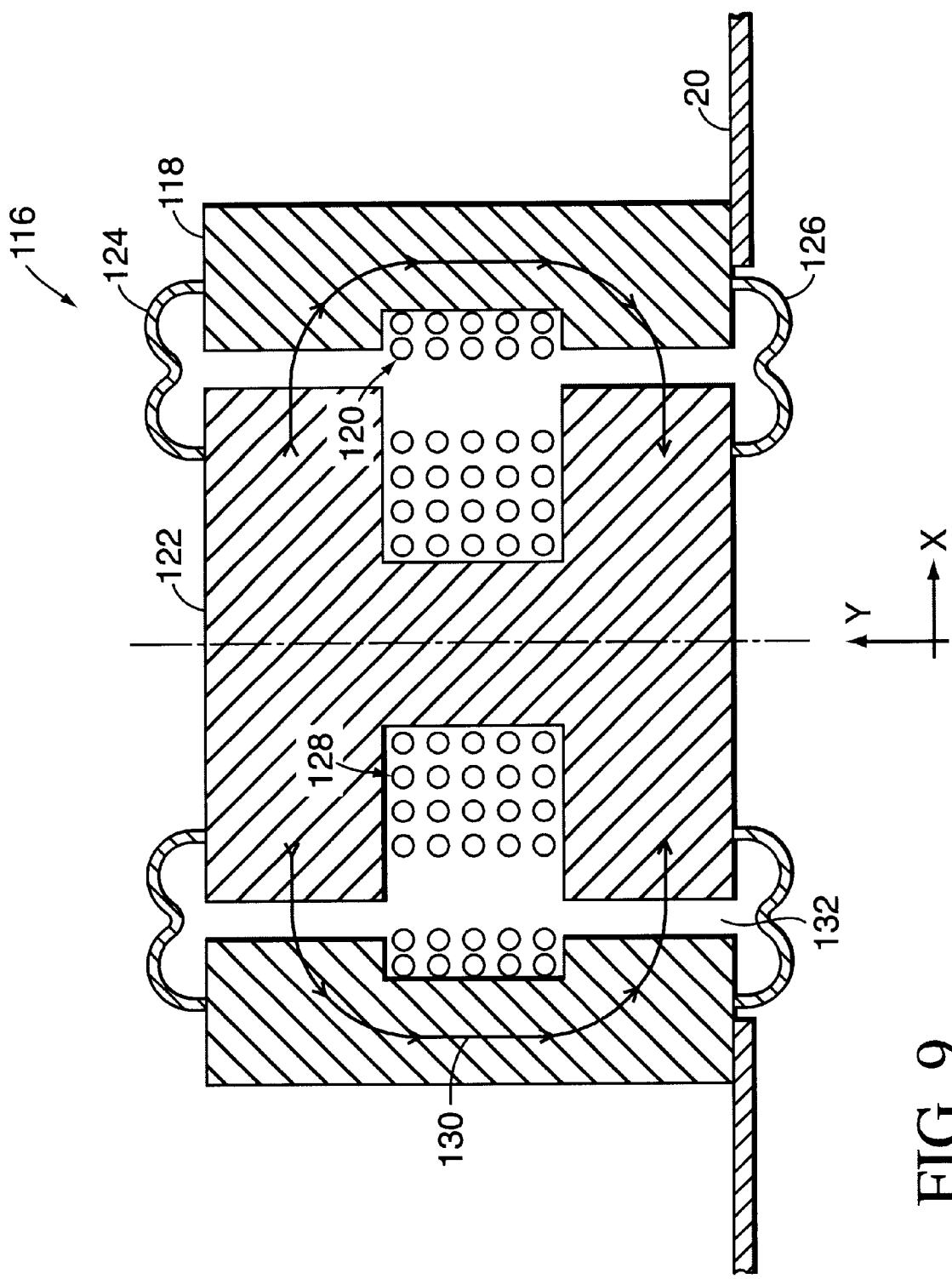
FIG. 9 is a cross sectional view of another embodiment of an inertial mass component of the counterbalance system of the present invention.

Referring to FIG. 9, an alternative inertial mass 116 which is suitable for use in the counterbalance system 12 of the present invention will now be described. The inertial mass 116 comprises a preferably cylindrical support member 118 which is attached to the counterbalance beam 20 by suitable means, such as welding or brazing, and an outer coil 120 which is mounted on the support member 118, ideally within a cylindrical recess formed on the inner diameter surface thereof. The inertial mass 116 also comprises a generally cylindrical bobbin 122 which is connected to the support member 118 by upper and lower annular flexure members 124 and 126, respectively. The inertial mass 116 further comprises an inner coil 128 which is mounted to the bobbin 128, optimally within an annular recess formed in the outer diameter surface thereof. The support member 118 and the bobbin 122 are both preferably made of a magnetically permeable material such as carbon steel. The flexural members 124, 126 are similar to the flexural members 70, 72 discussed above. Thus the bobbin 122, which is suspended by flexural members 124,126 in a manner described above for bobbin 68, is relatively free to move in the y-direction relative to the support member 118 but is stiffly held in the direction perpendicular to the y-axis.

The inertial mass 116 also includes means for selectively coupling the bobbin 122 to the counterbalance beam 20 in at least the direction of the y-axis. In this embodiment, the coupling of the bobbin 122 to the support member 118 is achieved by a magnetic field 130 that is generated in a gap 132 between the bobbin and the support member when one or both of the outer and inner coils 120, 128 is energized. With no current passing through the coils 120, 128, the natural frequency of the bobbin 122 is primarily a function of the spring stiffness of the flexural members 124, 126 and is determined from the following well known relation:

$$\Omega = SQRT\ [K/M],\qquad [1]$$

where $\Omega$=natural frequency in radians/sec, K=spring stiffness in newtons/meter, and M=mass in kilograms. In this uncoupled condition, the spring stiffness K of the flexural members 124, 126 is designed in conjunction with the mass of the bobbin 122 so that the natural frequency of the bobbin is lower than the operating frequency of the flowmeter 10. Again referring to FIG. 6, this condition would be analogous to that described above for the frequency response curve 92, which results in a negligible uncoupled response amplitude $A_2$ at the operating frequency $f_o$.

When current is conducted through the coils 120, 128, the magnetic field 130 in the gap 132 creates a restoration force on the bobbin 122 which is proportional to the current and the amount of deflection of the bobbin 122. This restoration force, which is cumulative of the restoration force from the flexural members 124, 126, has the effect of increasing the overall spring stiffness K in equation 1 above, and thereby increases the natural frequency $\Omega$ of the bobbin 122 correspondingly. In this coupled condition, the spring stiffness K of the flexural members 124, 126 and the restoration force from the magnetic field 130 are designed in conjunction with the mass of the bobbin 122 so that the natural frequency of the bobbin is higher than the operating frequency $f_o$ of the flowmeter 10. Again referring to FIG. 6, this condition would be analogous to that described above for the frequency response curve 90, which results in a coupled response amplitude $A_4$ near unity at the operating frequency $f_o$. Therefore, by regulating the amount of current in the coils 120, 128, the bobbin 122 can acquire a natural frequency which is higher than the operating frequency of the flowmeter, thereby resulting in substantially the entire mass of the bobbin 114 being coupled onto the counterbalance beam 20.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A Coriolis-type flowmeter which comprises:
    a flowtube through which a fluid to be measured is permitted to flow, the flowtube comprising first and second ends,
    an elongated counterbalance beam which is vibrationally coupled to the flowtube proximate the first and second ends;
    the flowtube and the counterbalance beam each comprising a corresponding natural frequency;
    means for vibrating the flowtube and the counterbalance beam in opposition to one another;
    at least one inertial mass which includes a support member that is attached to the counterbalance beam and a mass member that is supported entirely by the counterbalance beam;
    the mass member being connected to the support member such that during vibration of the counterbalance beam, the mass member is generally free to move perpendicular to the counterbalance beam but is generally restricted from moving parallel to the counterbalance beam; and
    means for selectively coupling the mass member to the support member to thereby make the natural frequency of the counterbalance beam approximately equal to the natural frequency of the flowtube.

2. The flowmeter of claim 1, wherein the counterbalance beam comprises a cross section having a configuration selected from the following group: U-shaped, C-shaped, square, rectangular, round, and elliptical.

3. The flowmeter of claim 1, comprising a plurality of inertial masses which are positioned along the length of the counterbalance beam.

4. The flowmeter of claim 3, comprising one or more pairs of inertial masses, the inertial masses of each pair being positioned symmetrically about the mid-length centerline of the counterbalance beam and having substantially the same mass magnitude.

5. The flowmeter of claim 1, wherein the support member comprises a generally tubular configuration and the mass member is positioned at least partially within the support member.

6. A Coriolis-type flowmeter which comprises:
    a flowtube through which a fluid to be measured is permitted to flow, the flowtube comprising first and second ends;
    an elongated counterbalance beam which is vibrationally coupled to the flowtube proximate the first and second ends;
    the flowtube and the counterbalance beam each comprising a corresponding natural frequency;
    means for vibrating the flowtube and the counterbalance beam in opposition to one another;
    at least one inertial mass which includes a support member that is attached to the counterbalance beam and a mass member that is connected to the support member such that during vibration of the counterbalance beam, the mass member is generally free to move perpendicular to the counterbalance beam but is generally restricted from moving parallel to the counterbalance beam; and means for selectively coupling the mass member to the support member to thereby make the natural frequency of the counterbalance beam approximately equal to the natural frequency of the flowtube;

wherein the coupling means comprises:
an electric coil which when energized will generate a magnetic field across a gap between the support member and the mass member; and
an MRF contained within the gap;
wherein when the coil is energized, the magnetic field will cause the MRF to stiffen and thereby effectively couple the mass member to the support member.

7. A Coriolis-type flowmeter which comprises:

a flowtube through which a fluid to be measured is permitted to flow, the flowtube comprising first and second ends;

an elongated counterbalance beam which is vibrationally coupled to the flowtube proximate the first and second ends;

the flowtube and the counterbalance beam each comprising a corresponding natural frequency;

means for vibrating the flowtube and the counterbalance beam in opposition to one another;

at least one inertial mass which includes a support member that is attached to the counterbalance beam and a mass member that is connected to the support member such that during vibration of the counterbalance beam, the mass member is generally free to move perpendicular to the counterbalance beam but is generally restricted from moving parallel to the counterbalance beam; and means for selectively coupling the mass member to the support member to thereby make the natural frequency of the counterbalance beam approximately equal to the natural frequency of the flowtube;

wherein the coupling means comprises:
a first electric coil which is mounted on the mass member and which when energized will generate a first magnetic field across a gap between the support member and the mass member; and
a second electric coil which is mounted on the support member generally opposite the first electric coil and which when energized will generate a second magnetic field across the gap;
wherein when at least one of the first and the second electric coils is energized, the corresponding first and second magnetic fields will create a magnetic force between the coils that will couple the mass member to the support member.

8. A method for balancing a flowtube of a Coriolis mass flowmeter comprising:

vibrationally coupling an elongated counterbalance to the flowtube;

supporting at least one inertial mass entirely on the counterbalance and connecting the inertial mass to the counterbalance such that during vibration of the counterbalance, the inertial mass is generally free to move perpendicular to the counterbalance but is generally restricted from moving parallel to the counterbalance; and selectively coupling the inertial mass to the counterbalance in a direction perpendicular to the counterbalance to an extent required to balance the flowtube.

9. The method of claim 8, further comprising positioning the inertial mass near the mid-length centerline of the counterbalance.

10. The method of claim 8, further comprising:

connecting a plurality of inertial masses to the counterbalance; and positioning the inertial masses along the length of the counterbalance.

11. The method of claim 10, further comprising:

connecting one or more pairs of inertial masses to the counterbalance; and positioning the inertial masses of each pair symmetrically about the mid-length centerline of the counterbalance.

12. The method of claim 8, wherein the step of selectively coupling the inertial mass to the counterbalance comprises:

affixing a support member to the counterbalance;

positioning the inertial mass adjacent the support member;

disposing an MRF between the support member and the inertial mass; and applying a magnetic field through the MRF;

wherein depending on the strength of the magnetic field, the MRF will stiffen and at least partially couple the inertial mass to the support member.

13. The method of claim 8, wherein the step of selectively coupling the inertial mass to the counterbalance comprises:

affixing a support member to the counterbalance;

positioning the inertial mass adjacent the support member;

generating a magnetic force between the support member and the inertial mass;

wherein depending on the strength of the magnetic force, the inertial mass will be at least partially coupled to the support member.

* * * * *